G. C. DERBY.
AIR PURIFYING AND HUMIDIFYING APPARATUS.
APPLICATION FILED JULY 11, 1912.
1,047,765.
Patented Dec. 17, 1912.
3 SHEETS—SHEET 1.
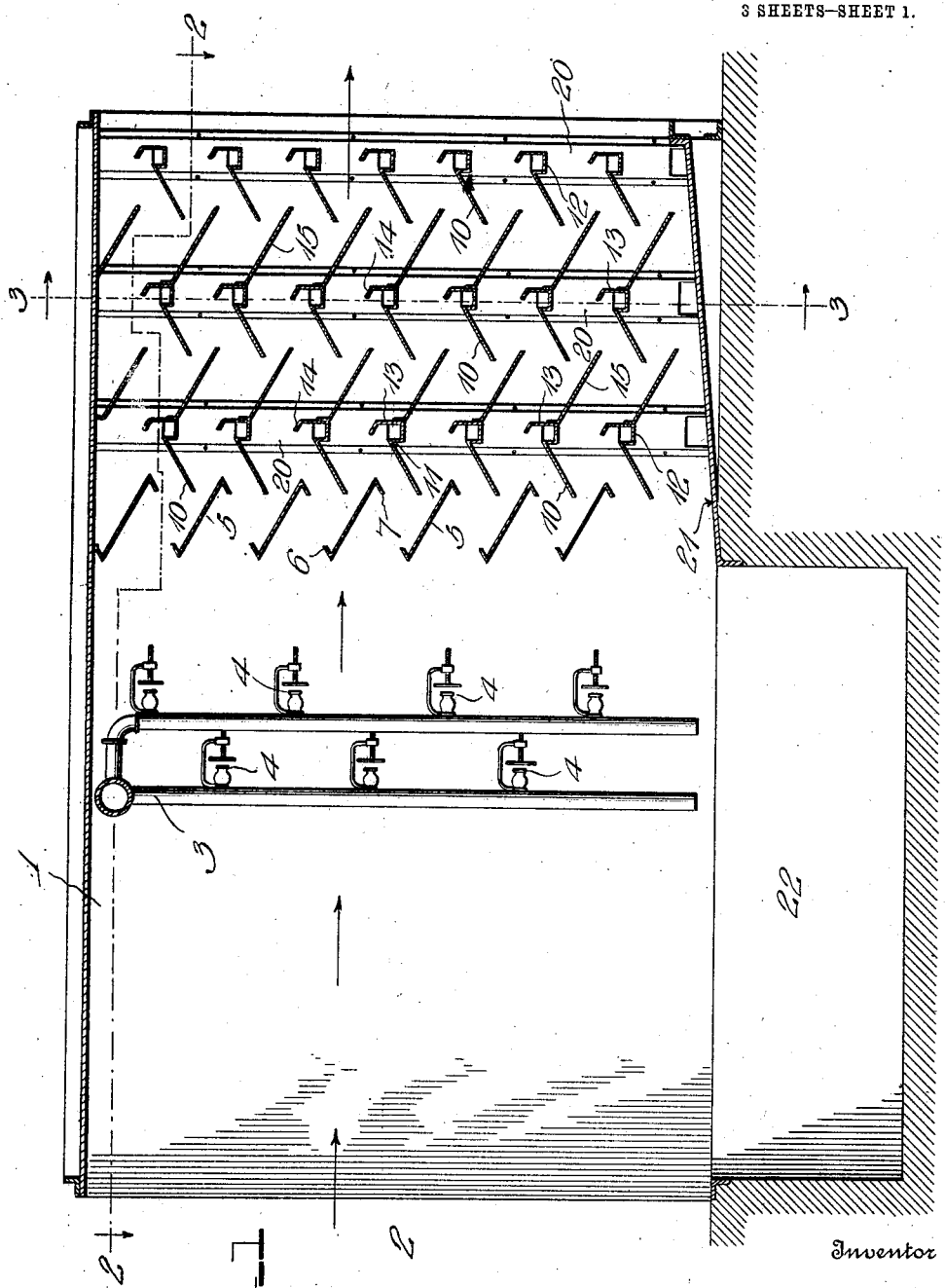
Witnesses
Inventor
George C. Derby
By H. B. Willson & Co.
Attorneys

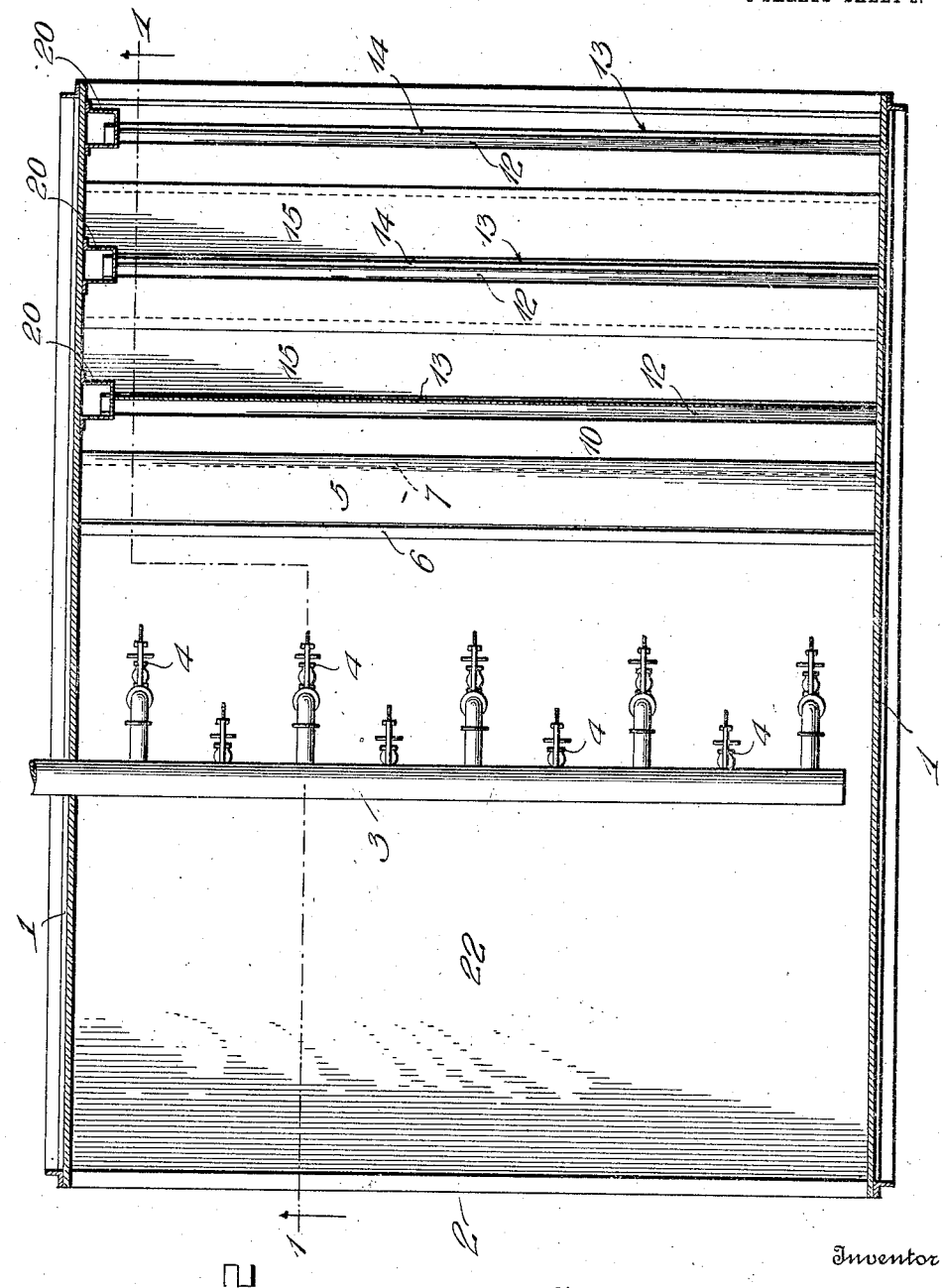

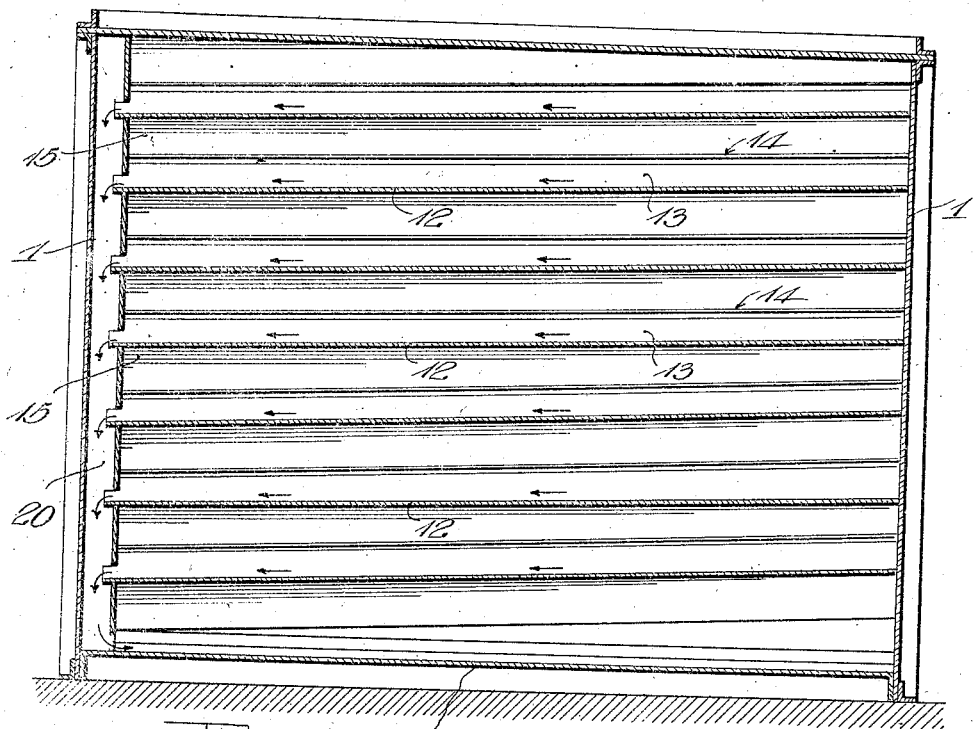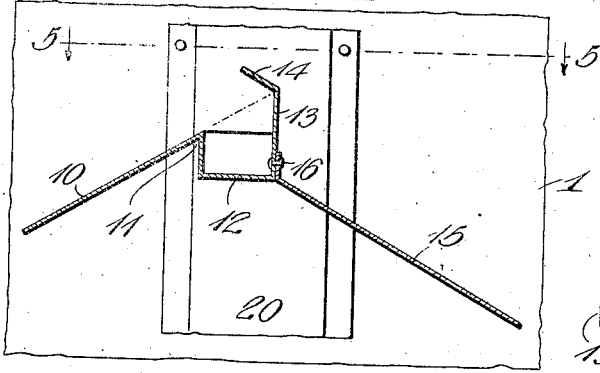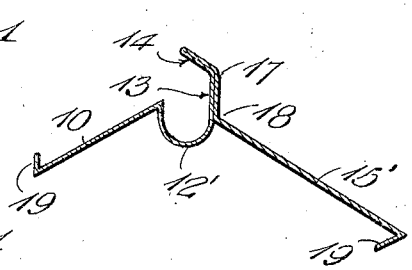

UNITED STATES PATENT OFFICE.

GEORGE C. DERBY, OF SAN FRANCISCO, CALIFORNIA.

AIR PURIFYING AND HUMIDIFYING APPARATUS.

1,047,765.  Specification of Letters Patent.  Patented Dec. 17, 1912.

Application filed July 11, 1912. Serial No. 708,906.

*To all whom it may concern:*

Be it known that I, GEORGE C. DERBY, a citizen of the United States, residing at San Francisco, in the county of San Francisco and State of California, have invented certain new and useful Improvements in Air Purifying and Humidifying Apparatus; and I do declare the following to be a full, clear, and exact description of the invention, such as will enable others skilled in the art to which it appertains to make and use the same.

This invention relates to ventilation, and more especially to air moistening, cooling, and cleansing apparatus; and the object of the same is to produce a device of this character for purifying and humidifying air which at no point will cause the water to flow over the plates or baffles backward along the draft of air or to drip across it. I find that when the water has either of these movements relative to the direction of the blast of air, the latter becomes excessively saturated because the water is broken up into fine particles or spray and is carried forward with the air to a greater extent than is desirable. Accordingly I have devised an apparatus whose ultimate object is to avoid this excessive humidity, to which end the invention consists in the details of construction hereinafter more fully described and claimed and shown in the drawings wherein—

Figure 1 is a vertical longitudinal sectional view through this device, taken on the line 1—1 of Fig. 2; Fig. 2 is a horizontal section taken on the line 2—2 of Fig. 1. Fig. 3 is a vertical transverse section taken on the line 3—3 of Fig. 1; Fig. 4 is an enlarged cross section through one of the eliminator plates near the outlet pipe, taken about on the line 1—1 of Fig. 2; and Fig. 5 is a horizontal section on the line 5—5 of Fig. 4. Fig. 6 is a sectional detail of a slightly modified form of one of the eliminator plates.

By preference this entire device is constructed of metal, sheet metal being used for the plates and gutters and possibly also for the skeleton framework, and the metal should be treated to prevent rust, while the exact sizes and proportions of parts are immaterial.

The framework 1 may be of any suitable construction and will be of sufficient size to occupy the space into which the apparatus is placed or built, its front end 2 being open to the admission of fresh air which may be directed thereinto, if desired, by means of a fan, not shown and forming no part of the present invention. Adjacent this end is arranged a water-supply system 3, whose pipes have jet nozzles 4 delivering water in jets or sprays toward the rear as shown, and these nozzles are arranged in staggered relation to each other so that their spray will substantially cover the interior of the apparatus as well known in devices of this character. Next in rear of the water supply system I preferably dispose a series of downwardly inclined baffle plates 5 whose front and rear edges may be reversely bent or flanged as at 6 and 7 if desired, although this detail of construction is not necessary. The exact angle to a horizontal at which these plates are disposed is immaterial, and their obvious purpose is to break up the current of air into horizontal strata rather than permitting it to flow through the framework in one entire mass, and direct each stratum obliquely downward. In rear of the baffle plates, in turn, I dispose a plurality of series of my improved eliminating plates, there being as many series as necessary to thoroughly wash and cleanse the air and the series being duplicates of each other, and there being as many members or plates in each series as the size of the device shall require and each plate a duplicate of all other plates. The several plates in each series are superimposed one above the other, and the several plates in the next adjacent series are similarly arranged excepting that they are located out of line with the plates in the first series; and this arrangement is followed throughout all the series employed.

Each plate forming the principal feature of my present invention is constructed as follows: Its forward or eliminating leaf 10 is perhaps 2 to 6 inches wide and is inclined upward toward the rear at an angle of thirty degrees to the horizontal, here the plate is bent at an acute angle 11 and then formed into a gutter 12 standing at the rear edge of the leaf 10 (this gutter being shown angular in Fig. 4 and semi-circular at 12' in Fig. 6) and the rear wall 13 of said gutter rises higher than its front wall and to a point practically in line with the plane of the leaf 10 extended, as the dotted line in Fig. 4 will show, and at its upper edge above the gutter 12 this wall is continued into a shield 14 which is deflected forward over the gutter and stands at an acute angle to the plane of said leaf 10. The other or deflecting leaf 15 extends from the lower portion of the rear wall 13 of the gutter obliquely downward, and serves the same function with respect to the eliminating leaf 10 of the plate next in the rear that the baffle plate 5 above referred to serves with respect to the eliminating leaf 10 of the plate I am now describing. In Fig. 4 the deflecting leaf 15 is riveted at 16 to the rear wall 13, whereas in Fig. 6 the wall 13 and shield 14 are folded back upon each other as at 17 and bent integrally as at 18 into the leaf 15' so that the entire plate is made of one rather wide strip of metal. The last-named view also shows the front and rear edges of both leaves as reversely bent back as shown at 19, but this detail is not important.

Each series of plates above referred to comprises several of those just described, superimposed above and spaced from each other as seen in Fig. 1, and so constructed that the folds or parts forming the walls of the gutters are projected at one end of the plate in order that they may enter an upright pipe 20 along this side of the framework, and all the plates in the several series are inclined slightly toward their several pipes 20. The latter deliver at their lower ends onto a common floor 21 which also is inclined toward and delivers into a sump 22 wherein the water may be boiled or filtered or from which it can be delivered into the sewer or other waste, but if it is purified in any manner it can be taken from this sump and jetted again into the apparatus as described above.

With this construction of parts, the blast of air enters the front of the apparatus as indicated by the arrows, passes first to and through the spray caused by the various jets and is thereby thoroughly moistened, and in this condition it strikes the underside of the downwardly inclined baffles 5 and is cut up into horizontal strata and directed obliquely downward onto the eliminating leaves 10 of the plates in the first series; here its forward impulse carries the thoroughly saturated air (mist) up the gently inclined leaf 10 so that the water moves with the air, and when the acute angle 11 is reached the moisture passes over into the gutter 12 while the air continues upward along the course indicated by the dotted line in Fig. 4 and strikes the forward face of the shield 14; here any surplus moisture is taken out of the air and falls back into the gutter 12, while the air itself passes off the face of the shield and over its upper edge, and thence onward to the underside of the deflecting leaf 15 of this series immediately above; by this leaf it is deflected again downward and permitted to pass on to the corresponding plate in the series next to the rear.

The water thus extracted from the air drops into the gutter which, being inclined slightly to one side, causes it to flow toward and delivers it into the pipe 20, and all the various pipes 20 deliver onto the floor 21, and the latter into the sump. Thus it will be seen that at no point throughout the course of this apparatus is the water flowing over the plates or baffles in a direction the reverse of that followed by the air, and at no point is the water dripping across the air which latter may be passing through the apparatus at a considerable velocity depending on the rapidity with which the fan or blower is revolved. I have sought in this apparatus to break up the water solely by the jet nozzles and not by the force of the air, and it is my intention to use the latter to throw the spray of water particles on the several different surfaces or leaves of the plates and to cause or permit it to move thereon in a natural manner rather than in a manner contrary to that induced by the current of air and therefore liable to cause trouble. By this statement I mean that I have found that water flowing in a direction the reverse of that followed by the air, or dripping or splashing across the air, is likely to be taken up again and carried forward so that the air issuing from the rear end of the apparatus is unduly moistened; but I have found that with this apparatus the jet nozzles perform the function of moistening and washing the air near the front end of the apparatus, and the various series of plates perform the function of taking the moisture out of the air so that the latter issues from the rear end of the apparatus pure and cool and moistened to a degree only dependent upon the force of the air current and the force and volume of the jets of water, and the size of the apparatus.

What is claimed as new is:—

1. An air purifying apparatus, the combination with means for moistening a column of air; of a plate inclined upward in a direction in which the air is flowing, a gutter across the upper edge of said plate and dropped below its projected plane, and a shield rising from in rear of said gutter to a point above said plane.

2. An air purifying apparatus, the combination with means for moistening a column of air; of a plate extending across the line of draft and comprising a leaf inclined upwardly in the direction in which the air is flowing and then bent downwardly at an acute angle at its rear edge into a gutter, whose rear wall rises to a point in the line of the projected plane of said leaf, and a shield rising above said rear wall and inclined forwardly.

3. An air purifying apparatus, the combination with means for moistening a column of air; of a plate extending across the line of draft and comprising a leaf inclined upwardly in the direction in which the air is flowing and then bent downwardly at an angle at its rear edge into a gutter whose rear wall rises to a point in the line of the projected plane of said leaf, a shield rising above said rear wall and inclined forwardly; and a deflecting leaf extending rearwardly and downwardly from said gutter.

4. In a device of the class described, the combination with means for moistening a horizontally flowing column of air; of a series of horizontally disposed and downwardly inclined baffle plates in rear of said means, and a plurality of upright series of eliminator plates in rear of said series of baffles, each series of eliminator plates comprising several like plates spaced vertically from each other the same distance as are the baffles, and each plate consisting of a rearwardly and upwardly inclined leaf upon which the air is deflected by one of the baffles, a gutter across the upper edge of the leaf and standing wholly below its projected plane, and a rearwardly and downwardly inclined leaf extending from the rear wall of said gutter and serving as a baffle to a plate in the series next to the rear.

5. In a device of the class described, the combination with means for moistening a horizontally flowing column of air; of a series of horizontally disposed and downwardly inclined baffle plates in rear of said means, and a plurality of upright series of eliminator plates in rear of said series of baffles, each series of eliminator plates comprising several like plates spaced vertically from each other and each plate consisting of a rearwardly and upwardly inclined leaf upon which the air is deflected by one of the baffles, a gutter across the upper edge of the leaf and standing wholly below its projected plane, means for extracting the water caught in all the gutters of any series, a forwardly inclined shield rising from the rear wall of each gutter above the line of said projected plane, and a deflecting leaf extending rearwardly and downwardly from said gutter.

6. In a device of the class described, the combination with means for moistening a horizontally flowing column of air; of a plurality of upright series of eliminator plates, each series comprising several like plates spaced vertically from each other and each plate consisting of a rearwardly and upwardly inclined leaf, a gutter across the upper edge of the leaf and standing wholly below its projected plane, a pipe connecting all the gutters of each series, a forwardly inclined shield rising from the rear wall of each gutter, and a deflecting leaf extending rearwardly and downwardly from said gutter.

In testimony whereof I have hereunto set my hand in presence of two subscribing witnesses.

GEORGE C. DERBY.

Witnesses:
S. W. DOHERTY,
E. L. KESHANE.